Oct. 12, 1926.
G. P. GREGORY
1,603,239
LIQUID GAUGE
Filed Dec. 4, 1924
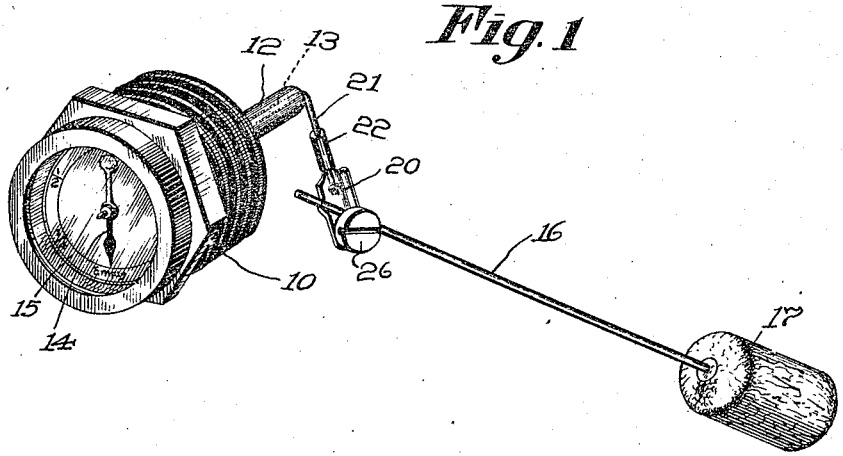
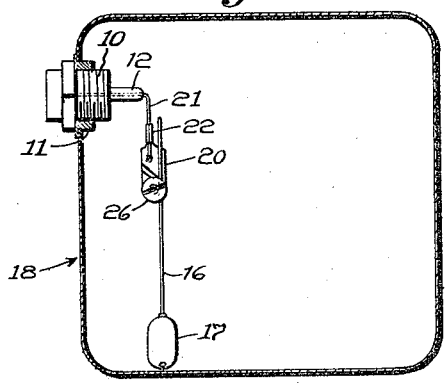
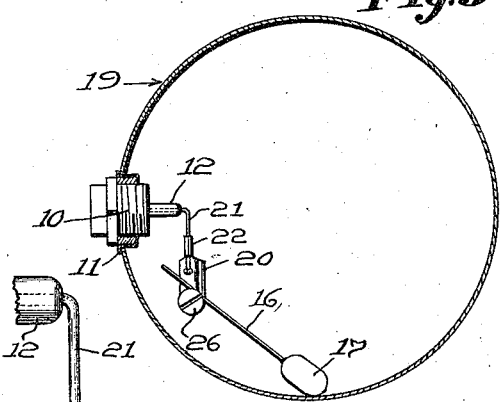
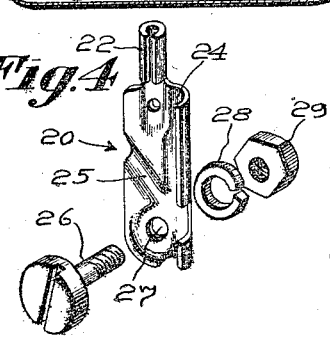
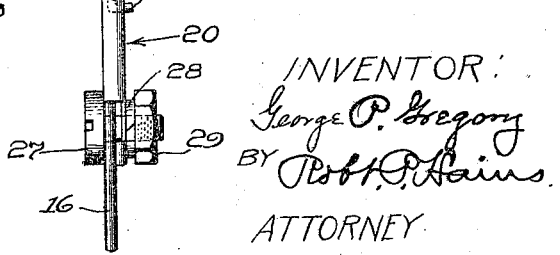
INVENTOR:
George P. Gregory
BY Robt P. Hains
ATTORNEY Patented Oct. 12, 1926.

1,603,239

UNITED STATES PATENT OFFICE.

GEORGE P. GREGORY, OF NEWTON, MASSACHUSETTS, ASSIGNOR TO THE BOSTON AUTO GAGE COMPANY, OF PITTSFIELD, MASSACHUSETTS, A CORPORATION OF MASSACHUSETTS.

LIQUID GAUGE.

Application filed December 4, 1924. Serial No. 753,816.

This invention relates to liquid gauges, and more particularly to a novel connection between the indicator-operating shaft and float rod for permitting the parts to be assembled in different relations to accommodate the shape and size of different tanks.

Liquid gauges constructed to be mounted in a side or end wall of a tank and operated by a float rod within the tank having been proposed heretofore, but the size and shape of the tanks in which these gauges are used may vary greatly, and it has been necessary heretofore to vary the size and construction of the gauges to meet the conditions imposed by different tanks.

The present invention is directed to an improved construction by which the various parts of a liquid gauge may be made standard, and certain parts are designed to be assembled differently to meet the conditions imposed by differently constructed tanks.

The novel features of the invention will be best understood from the following description when read in connection with the accompanying drawings illustrating one good practical form of the invention.

In the drawings:—

Fig. 1 is a perspective view of a liquid gauge provided with the improvement of the present invention.

Fig. 2, on a reduced scale, is a vertical sectional view thru a tank having straight side walls and provided with the gauge of the present invention.

Fig. 3 is a vertical sectional view thru a round tank provided with the gauge of the present invention, and showing the float rod in an inclined position.

Fig. 4 is a perspective view of a holder to be described, the parts of the clamping bolt being shown in spaced relation; and Fig. 5 is a side view of parts shown in Fig. 1.

In the drawings 10 designates the gauge head which may be screwed into an internally threaded ring 11 that may be soldered or brazed to the side wall of the liquid tank. The head 10 is provided with a rearwardly extending post 12 in which an indicator-operating shaft 13 is rotatably mounted, and the rotative movement of the shaft 13 is imparted to the indicator needle 14. This needle may be mounted in a casing as shown and moves over a dial 15. The head 10, and parts contained therein, may be of usual or any preferred construction and forms no part of the present invention.

The indicator-operating shaft 13 is rotated by a float rod 16 having a float 17 secured thereto, and in order to install the gauge in different tanks it may be necessary to vary the length of the rod 16, or to vary the angle at which this rod extends from the shaft 13.

In Fig. 2 the liquid gauge is shown as installed in a tank 18 having vertical side walls, and when used in this type of tank the float rod 16 may be disposed at substantially a right angle to the shaft 13 to swing in a plane approximately parallel to the side wall of the tank.

In Fig. 3 the liquid gauge is shown as mounted in a cylindrical shaped tank 19, and in this type of tank it is necessary that the float rod 16 extend inwardly so that the float 17 will be disposed near the vertical central plane of the tank.

In accordance with the present invention means is provided for securing the float rod 16 to the shaft 13 so that the rod will extend either in a vertical direction, as shown in Fig. 2, or in an inclined direction, as shown in Fig. 3. The means for accomplishing this may be variously constructed and is shown as comprising a holder 20 conveniently formed of sheet metal. The shaft 13 may be bent, as shown, to provide the laterally extending arm 21 to which the holder 20 is rigidly secured. To this end a portion of the holder may be bent to form the tubular part 22 adapted to receive the arm 21, and a bent end 23 of the arm may be inserted thru a hole in the holder and soldered therein.

The holder 20 is adapted to secure the rod 16 either in the position shown in Fig. 2 in which it is disposed at approximately a right angle to the shaft 13, or in the position shown in Fig. 3 in which it is disposed at an angle of approximately 45° to the shaft 13, and in the construction shown the holder is provided with a vertically extending groove 24 and an inclined groove 25 disposed at an angle of approximately 45° to the vertical groove. A clamping bolt 26, the shank of which extends thru a hole 27, serves to clamp the float rod in either groove, and this bolt is provided with a spring washer 28 and a nut 29.

The holder shown forms a simple and convenient means for rigidly securing the float rod to the shaft 13 in either a vertical or inclined position, and it also permits the rod 16 to be adjusted in the direction of its length to accommodate tanks of different depth.

Thru the use of the present invention the various parts of the liquid gauge may be standardized and manufactured in large quantities, since the conditions imposed by the differently constructed tanks may be met by making the rod 16 relatively long to accommodate the deep tanks, and by cutting the rod off for the shallow tanks, and if the tank in which the gauge is installed has vertical side walls, the parts may be assembled as in Fig. 2, while if the tank is round, the parts may be assembled as in Fig. 3. In this manner the standard gauge parts may be used in tanks of various different sizes and shapes.

What is claimed is:—

1. A liquid gauge for indicating the depth of liquid in a tank, comprising in combination, a gauge head constructed to be secured to a side wall of a tank, an indicator rotatably mounted therein, an indicator-operating shaft rotatably journaled in said head and having a laterally extending arm at its inner end, a float rod adapted to be adjusted in the direction of its length relative to said arm and having a float at one end, and means for rigidly securing the float rod to said laterally extending arm so that the float rod will be firmly held in either one of two predetermined positions upon said arm, comprising a holder rigidly secured to said arm and having one groove for holding the float rod approximately parallel to said arm and a second groove for holding the float rod at a substantial angle to said arm, and means for clamping the float rod in either of said positions, said clamping means being operable to clamp the float rod in different positions of adjustment in the direction of its length.

2. A liquid gauge for indicatng the depth of liquid in a tank, comprising in combination, a gauge head constructed to be secured to a side wall of a tank and having an indicator rotatably mounted therein, an indicator-operating shaft secured to the indicator and rotatably supported by said head, a float rod having a float at one end, and means for operatively connecting the float rod to said shaft so that the float rod will be firmly held in either one of two predetermined positions at different angles to said shaft, comprising a holder rigidly connected to the shaft and having one rod-receiving groove for holding the float rod at substantially right angles to said shaft and having a second groove for holding the rod at an angle of approximately 45 degrees to said shaft, and means for clamping the rod in either groove.

3. A liquid gauge for tanks, comprising in combination, a gauge head constructed to be secured to a side wall of a tank and having an indicator supported to rotate within the head, an indicator-operating shaft rotatably supported by said head, a float rod having a float at one end, and means for operatively connecting the float rod to said shaft so that the float rod will be firmly held in either one of two predetermined positions relative to the shaft and in each of which the float is rigidly connected to said shaft, comprising a holder rigidly connected to the shaft and having two rod positioning portions disposed at an angle to each other, and means for clamping the rod in engagement with one of said portions so that it extends at substantially a right angle to a wall of the tank or in engagement with the other portion so that it extends at a substantial inclination to said wall.

In testimony whereof, I have signed my name to this specification.

GEORGE P. GREGORY.